(12) United States Patent
Yuen et al.

(10) Patent No.: US 9,026,429 B2
(45) Date of Patent: May 5, 2015

(54) SYSTEMS AND METHODS FOR CHARACTER STRING AUTO-SUGGESTION BASED ON DEGREE OF DIFFICULTY

(71) Applicants: Jenny Yuen, Cambridge, MA (US); Luke St. Clair, Redmond, WA (US)

(72) Inventors: Jenny Yuen, Cambridge, MA (US); Luke St. Clair, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 334 days.

(21) Appl. No.: 13/706,269

(22) Filed: Dec. 5, 2012

(65) Prior Publication Data

US 2014/0156262 A1 Jun. 5, 2014

(51) Int. Cl.
*G06F 17/27* (2006.01)

(52) U.S. Cl.
CPC ............ *G06F 17/276* (2013.01); *G06F 17/273* (2013.01); *G06F 17/2735* (2013.01); *G06F 17/274* (2013.01)

(58) Field of Classification Search
USPC ........ 704/1–10, 251, 255, 257, 270; 345/175; 707/769; 715/261
See application file for complete search history.

(56) References Cited

U.S. PATENT DOCUMENTS

| 8,601,019 | B1 * | 12/2013 | Weininger et al. ............ 707/769 |
| 2011/0154193 | A1 * | 6/2011 | Creutz et al. .................. 715/261 |
| 2014/0028571 | A1 * | 1/2014 | St. Clair ....................... 345/173 |

OTHER PUBLICATIONS

U.S. Appl. No. 13/631,489, filed Sep. 28, 2012, Gandhi.
U.S. Appl. No. 13/396,559, filed Feb. 14, 2012, Erick Tseng.

* cited by examiner

*Primary Examiner* — Huyen X. Vo
(74) *Attorney, Agent, or Firm* — Baker Botts L.L.P.

(57) ABSTRACT

In one embodiment, a method includes receiving one or more characters of a character string as a user enters the character string into a graphical user interface (GUI) of a computing device. The method also includes determining a degree of difficulty of the user entering the character string into the GUI of the computing device. The method further includes, if the degree of difficulty is at least approximately equal to or exceeds a pre-determined threshold, providing for display to the user an auto-suggestion for completing the character string for the user.

20 Claims, 5 Drawing Sheets

SYSTEMS AND METHODS FOR CHARACTER STRING AUTO-SUGGESTION BASED ON DEGREE OF DIFFICULTY

TECHNICAL FIELD

This disclosure generally relates to systems and methods for providing for input to a computer system, including providing for input to a mobile computing and/or communication system using an input device having an electronic visual display, such as a touch screen, and auto-suggesting a character string based on degree of difficulty.

BACKGROUND

Mobile computing and communication devices, such as cellphones, PDAs, tablet computers, and mini-laptops, are widely used to perform a variety of computing and communication tasks. Computing devices can include one or more input devices to receive input from a user, including a keyboard, pointing device, microphone, camera, or other suitable input device. Some computing devices can allow a user to provide input on an electronic visual display, such as a touch screen. In this manner, a user can provide input by touching a certain portions of the electronic visual display corresponding to a desired input. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is related to a method including receiving one or more characters of a character string as a user enters the character string into a graphical user interface (GUI) of the computing device, determining a degree of difficulty of the user entering the character string into the GUI of the computing device, and if the degree of difficulty is at least approximately equal to or exceeds a pre-determined threshold, providing for display to the user an auto-suggestion for completing the character string for the user.

For example and as embodied herein, such a method may allow a user to receive an auto-suggestion for completing the character string if the degree of difficulty of entering the character string exceeds a pre-determined threshold (or is approximately equal to a pre-determined threshold). As such, the user can receive the auto-suggestion when it may be needed, but may not receive the auto-suggestion when it is not needed (such as when completing the character string is easy). As an example, the user may receive the auto-suggestion when the user is entering the character string "The address of the White House is 1600 Pennsylvania Avenue, NW Washington, D.C. 20500.", but may not receive the auto-suggestion when the user is entering the character string "code".

In some embodiments, a character string may include a word (such as "code)", a phrase (such as "the end of the street"), a sentence (such as "I live at the end of the street"), a paragraph, an address, a number, a phone number, any other grouping of characters, or any combination of the preceding. In some embodiments, the degree of difficulty of the user entering the character string may be based (at least in part) on a length of the character string (such as how many characters have already been entered by the user), a number of keyboard shifts associated with entering the character string (such as how many times the user has switched between various keyboards while entering the character string), a number of special characters in the character string (such as the number of punctuations, accented characters, or other special characters that have already been input by the user), a number of capitalizations in the character string (such as the number of times a user has already capitalized a character while inputting the character string), an amount of time associated with entering the character string (such as if the user has already spent, for example, 23 seconds inputting the characters), an amount of time associated with entering subsequent characters of the character string (such as if the user has already spent, for example, 10 seconds, between inputting the previous character and the next character), a keyboard positional distance between input characters of the character string (such as if one of the characters input by the user is in the top left corner of the keyboard while another character is in the bottom right corner of the keyboard), any other indication of input difficulty, or any combination of the preceding.

In some embodiments, completing a character string may include any suitable manner of providing one or more characters to the character string in order to complete the character string. For example, completing a character string for the user may include correcting spelling in the character string (such as correcting the spelling of "helo" to "hello"), correcting grammar in the character string, (such as changing "I lie the pencil on the table" to "I lay the pencil on the table"), correcting punctuation in the character string (such as adding a period to the end of a sentence), completing a word (such as completing the entry "colo" to be "color"), completing a phrase (such as completing the entry "as soon as p" to be "as soon as possible"), completing a sentence (such as completing the entry "The address of the White House is" to be "The address of the White House is 1600 Pennsylvania Avenue, NW Washington, D.C. 20500."), replacing a word (such as replacing the word "there" with the word "their"), replacing a number (such as replacing the number "53" with the number "35"), any other manner of completing the character string, or any combination of the preceding.

The disclosed subject matter is also related to one or more computer-readable non-transitory storage media embodying software that is operable when executed to: receive one or more characters of a character string as a user enters the character string into a graphical user interface (GUI) of a computing device, determine a degree of difficulty of the user entering the character string into the GUI of the computing device, and, if the degree of difficulty is at least approximately equal to or exceeds a pre-determined threshold, providing for display to the user an auto-suggestion for completing the character string for the user.

The disclosed subject matter is further related to a system including one or more processors and a memory coupled to the processors. The memory includes instructions executable by the processors. The processors are operable when executing the instructions to: receive one or more characters of a character string as a user enters the character string into a graphical user interface (GUI) of a computing device, determine a degree of difficulty of the user entering the character string into the GUI of the computing device, and, if the degree of difficulty is at least approximately equal to or exceeds a pre-determined threshold, providing for display to the user an auto-suggestion for completing the character string for the user.

DESCRIPTION OF EXAMPLE EMBODIMENTS

Figure 1:
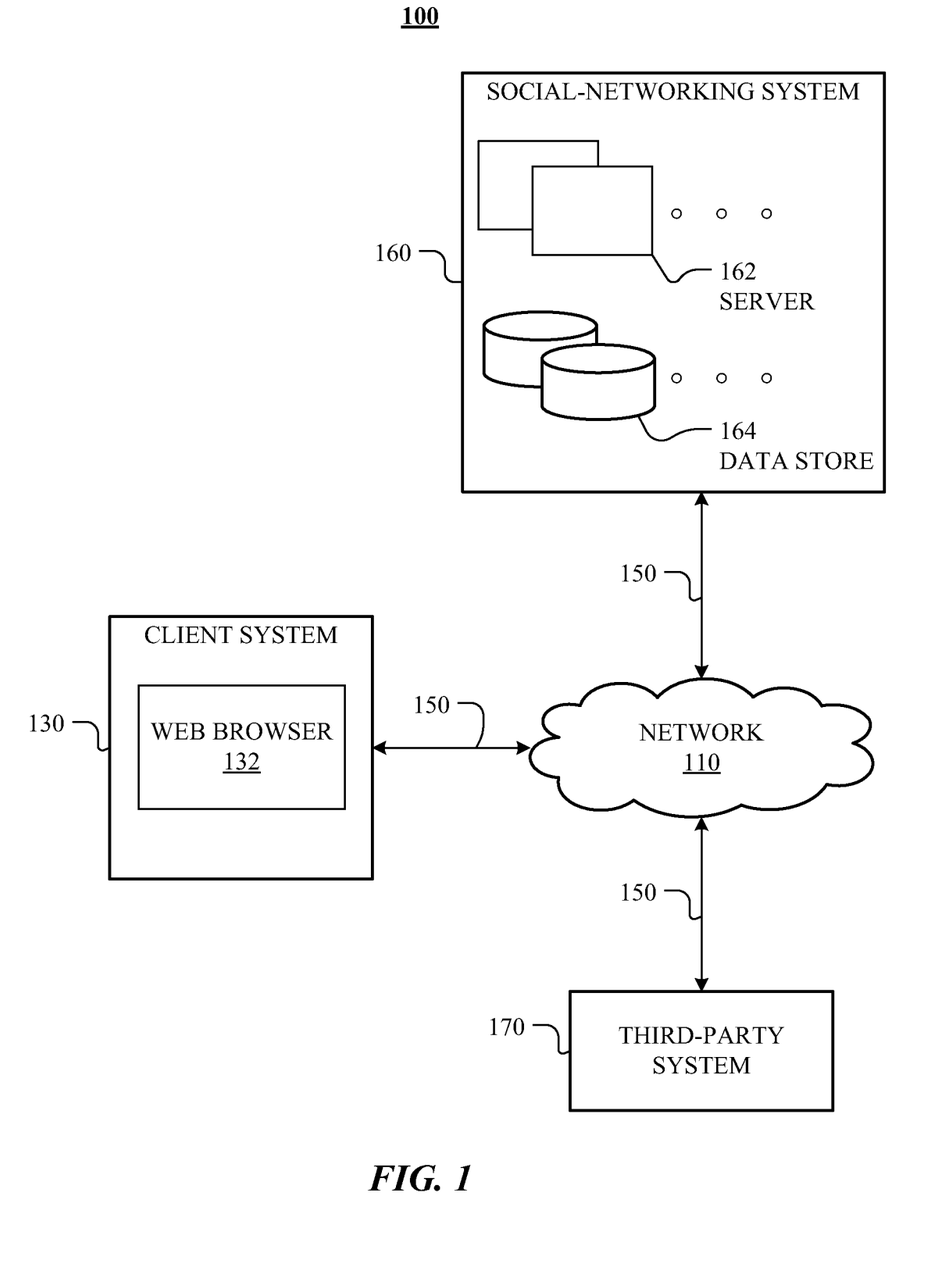
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In addition to interactions with other users, the social-networking system 160 provides users with the ability to perform various types of activities with social networking objects supported by the system. A social networking object can represent a variety of things, including, without limitation, profiles, applications (e.g., games playable within the social networking system), events (e.g., a page representative of a concert that users may attend), groups (e.g., a page to which user may belong), entity based pages or hubs (e.g., a page constituting a particular entity's presence on the social networking system), locations associated with a user (e.g., "Palo Alto, Calif., USA"), advertisements (e.g., a page including advertising content), user-generated content items (e.g., user posts), representations of physical or digital items, concepts, etc. A user can interact with a social networking object by associating with the object or performing an action on the object. For example, a user can interact with an object by joining a group, attending an event, checking-in to a location, becoming a fan of an organization's fan page, "liking" a fan page, posting to a fan page, etc. These are just a few examples of the objects upon which a user may act on in a social networking system, and many others are possible.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
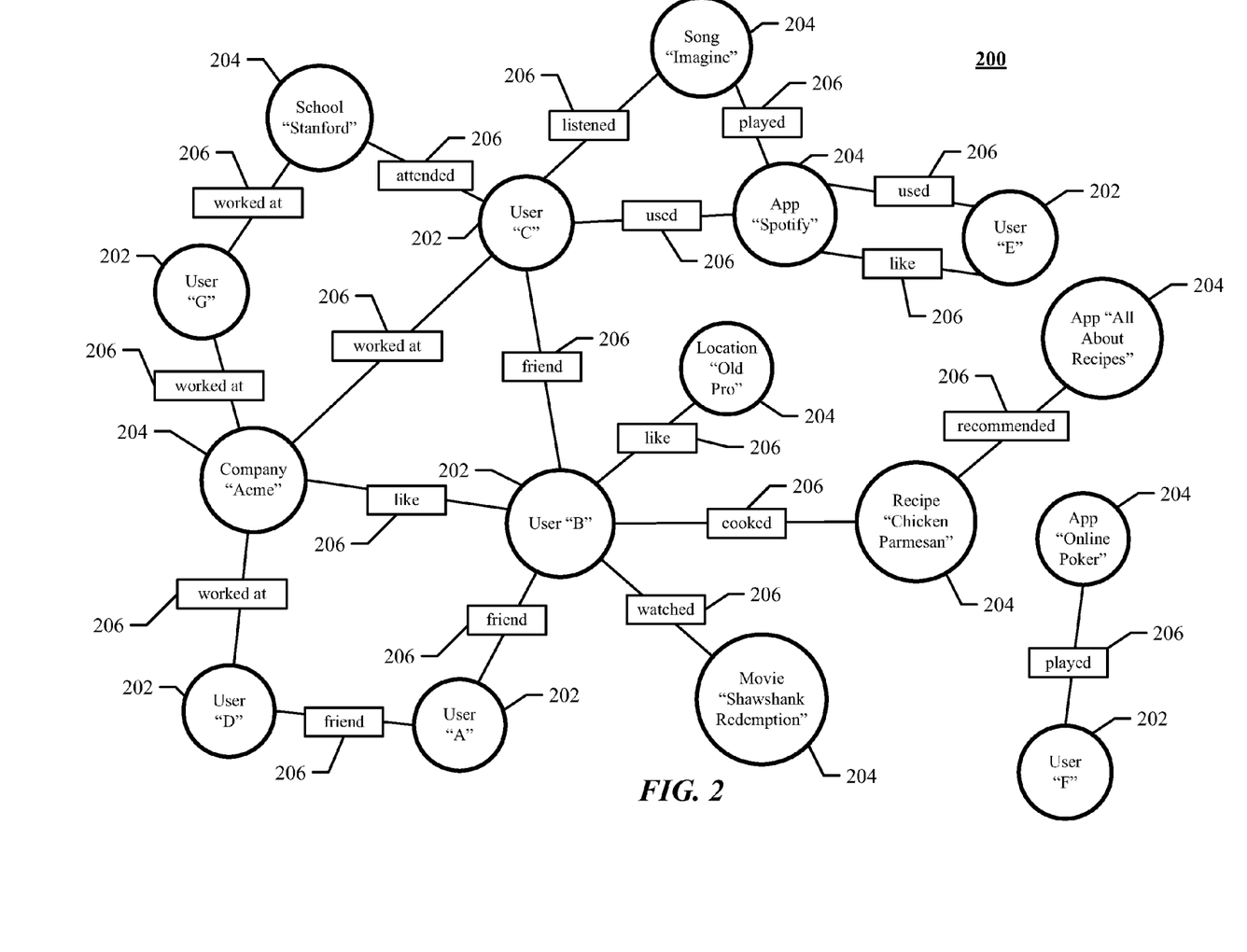
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, information from social-networking system 160 and/or social graph 200 may be explicit, stated information or explicit connections of a user to a node, object, entity, brand, or page on social-networking system 160. In addition or as an alternative, information from social-networking system 160 and/or social graph 200 may be inferred information (which may include analyzing a user's history, demographic, social or other activities, friends' social or other activities, subscriptions, or any of the preceding of other users similar to the user (based, e.g., on shared interests, connections, or events)).

Figure 3:
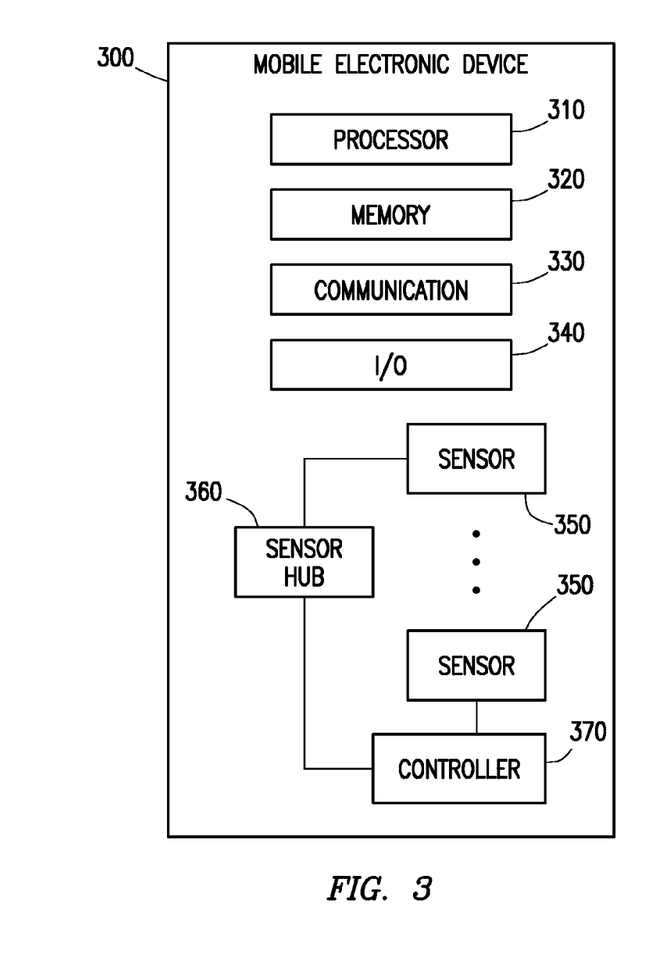
FIG. 3 illustrates an example personal computing device.

FIG. 3 illustrates an example personal computing device 300. In particular embodiments, personal computing device 300 may comprise a processor 310, a memory 320, a communication component 330 (e.g., antenna and communication interface for wireless communications), one or more input and/or output (I/O) components and/or interfaces 340, and one or more sensors 350. In particular embodiments, one or more I/O components and/or interfaces 340 may incorporate one or more sensors 350. In particular embodiments, personal computing device 300 may comprise a computer system or and element thereof as described in FIG. 7 and associated description. In particular embodiments, personal computing device 300 may be one example of a client system 130 of FIG. 1.

In particular embodiments, a personal computing device, such as a computing device, may include various types of sensors 350, such as, for example and without limitation: touch sensors (disposed, for example, on a display of the device, the back of the device and/or one or more lateral edges of the device) for detecting a user touching the surface of the mobile electronic device (e.g., using one or more fingers); accelerometer for detecting whether the personal computing device 300 is moving and the speed of the movement; thermometer for measuring the temperature change near the personal computing device 300; proximity sensor for detecting the proximity of the personal computing device 300 to another object (e.g., a hand, desk, or other object); light sensor for measuring the ambient light around the personal computing device 300; imaging sensor (e.g., camera) for capturing digital still images and/or video of objects near the personal computing device 300 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of personal computing device 300; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 360 may optionally be included in personal computing device 300. Sensors 350 may be connected to sensors hub 360, which may be a low power-consuming processor that controls sensors 350, manages power for sensors 350, processes sensor inputs, aggregates sensor data, and performs certain sensor functions. In addition, in particular embodiments, some types of sensors 350 may be connected to a controller 370. In this case, sensors hub 360 may be connected to controller 370, which in turn is connected to sensor 350. Alternatively, in particular embodiments, there may be a sensor monitor in place of sensors hub 360 for managing sensors 350.

Figure 4:
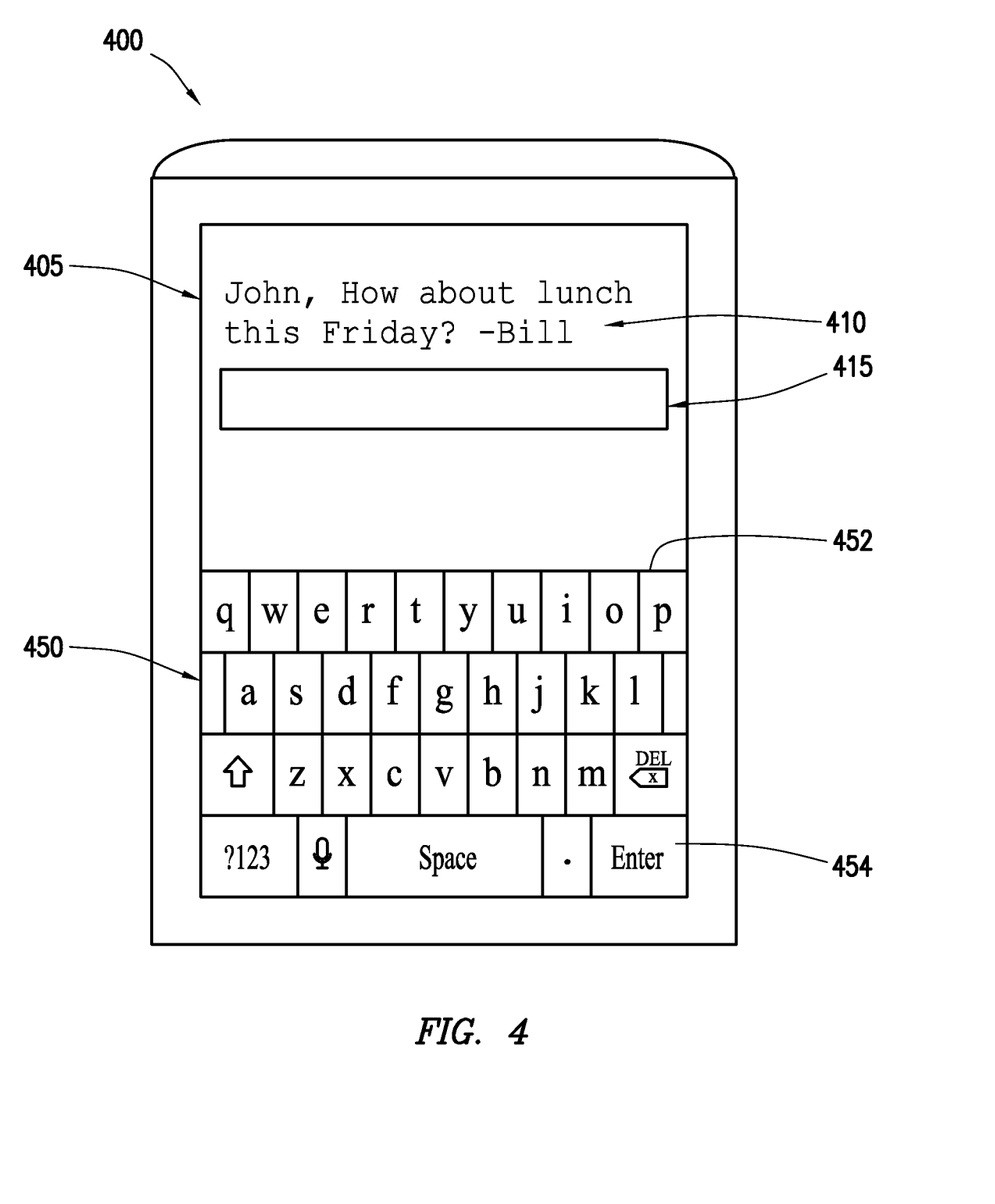
FIG. 4 illustrates an example scenario in which a user provides input to a personal computing device.

FIG. 4 illustrates an example scenario in which a user provides input to a personal computing device. FIG. 4 shows an example personal computing device 400. In particular embodiments, personal computing device 400 includes a touch screen 405. As shown in FIG. 4, a user may wish to use personal computing device 400 to communicate with one or more additional users (e.g., such as friends and/or family of the user). In order to do so, a user can tap on the screen (or input another appropriate indication) to unlock the device, browse to a web page (or any other application that allows a communication session to occur), and open up an interface for communication. In particular embodiments, some inputs to personal computing device 400 can be performed by tapping or pressing on a certain region of the screen 405. For example, in FIG. 4, a user can select a message received from another user by tapping on message 410. By tapping on message 410, field 415 may be displayed on screen 405, allowing the user to communicate with the other user by inputting data into field 415. As shown in FIG. 4, to permit a user to input data into a field, for example, when a field is selected, the personal computing device 400 can display a virtual keyboard 450 on the touch screen 405. The user can input data by typing on the symbols of the virtual keyboard 450 to input corresponding letters, numbers, symbols, etc. For example, to input a letter "P" into a field, the user can tap the region of the touch screen 405 marked as a box marked with a letter "P" (i.e., the "P" key 452). Similarly, to input a line break or the completion of an entry, the user can tap the "Enter" key 454, marked as a box with the word "Enter."

In particular embodiments, a user may have difficulty inputting a character string (such as difficulty inputting a word, phrase, sentence, paragraph, address, etc.) using a touch screen. For example, various character strings may be long (i.e., they may include many characters), have difficult spelling, have difficult punctuation, may require multiple shifts between various keyboards (such as switching from an alphabetical keyboard to a numerical and punctuation keyboard) in order to input, or may be difficult to input for various other reasons. In order to assist a user with inputting data into a personal computing device, traditional personal computing devices may provide a user with a suggestion for a word that the user is attempting to input. For example, if a user has input the letters "co", the personal computing device may suggest the following words: "code", "college", "color", "company", and "concert". This may allow the user to select one of these words to complete their input. Unfortunately, in many circumstances, the suggestion may be burdensome to the user. For example, when a user is entering a word that is easy for the user to successfully complete on their own (such as, for example, the word "code") it may be burdensome to the user to deal with such suggestions (such as to cancel the suggestion or search through the suggestions to find the correct word) when it may have been much easier for the user to just finish inputting the word without the suggestion.

According to one aspect of the disclosed subject matter, a personal computing device 400 can provide for display to a user an auto-suggestion for completing a character string being input by the user. Furthermore, in particular embodiments, such an auto-suggestion for completing the character string may only be provided if a degree of difficulty of the user entering the character string exceeds a pre-determined threshold (or is approximately equal to the pre-determined threshold). For example, if the user is inputting the character string "code", personal computing device 400 may determine that the degree of difficulty associated with the user's input of each character of the word does not exceed a pre-determined threshold (or is not approximately equal to the pre-determined threshold), and therefore, personal computer device 400 may not provide an auto-suggestion for completing the character string. As such, the user may not be burdened by an auto-suggestion when it is not needed. On the other hand, if the user is entering the character string "The address of the White House is 1600 Pennsylvania Avenue, NW Washington, D.C. 20500." personal computing device 400 may determine at some point during the user's entry of this character string that the degree of difficulty of the user entering the character string exceeds a pre-determined threshold (or is approximately equal to the pre-determined threshold). As such, personal computing device 400 may provide an auto-suggestion for completing this character string, helping the user complete the character string.

Figure 5:
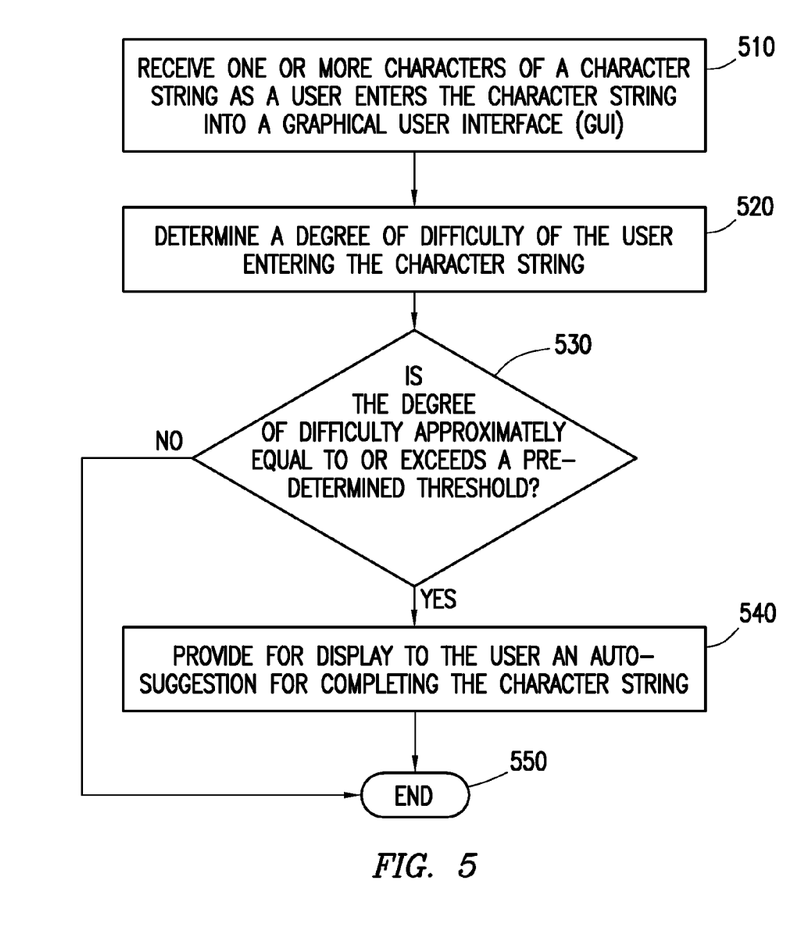
FIG. 5 illustrates an exemplary method for character string auto-suggestion based on degree of difficulty.

FIG. 5 illustrates an exemplary method for character string auto-suggestion based on degree of difficulty. At step 510, one or more characters of a character string are received as a user enters the character string into a graphical user interface (GUI). A character string may include any grouping of one or more characters. For example, a character string may be a word (such as "code)", a phrase (such as "the end of the street"), a sentence (such as "I live at the end of the street"), a paragraph, an address, a number, a phone number, any other grouping of characters, or any combination of the preceding. In particular embodiments, the characters of the character string may be received in any suitable manner. For example, the characters may be received by personal computing device 400 as the user utilizes touch screen 405 to input each character into a GUI displayed on touch screen 405. As another example, the characters may be received by a user copying and pasting the characters into a GUI displayed on touch screen 405. In particular embodiments, personal computing device 400 may receive any suitable number of the characters of the character string. For example, personal computing device 400 may receive a single character, two characters, three or more characters, or any other number of characters of the character string.

At step 520, a degree of difficulty of the user entering the character string is determined. The degree of difficulty may be determined in any suitable manner. For example, the degree of difficulty of the user entering the character string may be based (at least in part) on a length of the character string (such as how many characters have already been entered by the user), a number of keyboard shifts associated with entering the character string (such as how many times the user has switched between various keyboards while entering the character string), a number of special characters in the character string (such as the number of punctuations, accented characters, or other special characters that have already been input by the user), a number of capitalizations in the character string (such as the number of times a user has already capitalized a character while inputting the character string), an amount of time associated with entering the character string (such as if the user has already spent, for example, 23 seconds inputting the characters), an amount of time associated with entering subsequent characters of the character string (such as if the user has already spent, for example, 10 seconds, between inputting the previous character and the next character), a keyboard positional distance between input characters of the character string (such as if one of the characters input by the user is in the top left corner of the keyboard while another character is in the bottom right corner of the keyboard), any other indication of input difficulty, or any combination of the preceding.

In particular embodiments, in order to determine the degree of difficulty, a weighted factor may be applied to one or more of the indications of input difficulty of a character string. For example, the length of the character string may be weighted lower than, for example, the amount of time associated with entering the character string. In such an example, a character string may be determined to have a high degree of difficulty when the length of the input is only five characters, but the user has spent 23 seconds inputting these five characters. The weighting of the indications of input difficulty may be determined in any suitable manner. For example, a user of personal computing device 400 may determine how much weight should be given to particular indications. As another example, the weighting factors may be determined by the manufacturer and/or developer of personal computing device 400. In such an example, the user may be able to change the default weighting factors set by the manufacturer and/or developer. In particular embodiments, the degree of difficulty of the user entering the character string may include any type of expression difficulty. For example, the degree of difficulty may be expressed as one or more of the indications of difficulty (such as the user having already spent, for example, 23 seconds inputting the character string), a value (such as 8.5 out of 10.0), a letter grade (such as B+), a grouping (such as high, low, and/or medium), any other suitable expression, or any combination of the preceding.

At step 530, a determination is made regarding whether the degree of difficulty is approximately equal to or exceeds a pre-determined threshold. If the degree of difficulty is not approximately equal to the pre-determined threshold or does not exceed the pre-determined threshold, the method moves to step 550, where the method ends. On the other hand, if the degree of difficulty is approximately equal to the pre-determined threshold or does exceed the pre-determined threshold, the method moves to step 540 (discussed below).

The pre-determined threshold may include any type of expression of a threshold. For example, the pre-determined threshold may be expressed as one or more of the indications of input difficulty (such as the user being allocated, for example, 25 seconds to input a character string), a value (such as 7.3 out of 10.0), a letter grade (such as B), a grouping (such as high), any other suitable expression, or any combination of the preceding. In particular embodiments, the pre-determined threshold may be determined in any suitable manner. For example, a user of personal computing device 400 may determine the threshold. In such an example, the user may be allowed to select a threshold for which the user desires to receive auto-suggestions. As another example, the threshold may be determined by the manufacturer and/or developer of personal computing device 400. In such an example, the threshold may be based on data regarding what a typical user will find difficult to input (such as data indicating, for example, that a typical user is having difficulty if the input has taken longer than 20 seconds). In particular embodiments, the user may be able to change the default threshold set by the manufacturer and/or developer. As a further example, the pre-determined threshold may be pre-determined based on the user and/or the platform utilized by the user. In such an example, personal computing device 400 may utilize previous inputs by the user to determine (using, for example, machine learning) the pre-determined threshold. In particular, if the user typically inputs character strings within 10 seconds, personal computing device 400 may set the pre-determined threshold for the user at 9 seconds.

In particular embodiments, whether the degree of difficulty exceeds the pre-determined threshold (or is approximately equal to the pre-determined threshold) may be determined based on comparing the degree of difficulty to the pre-determined threshold. In particular embodiments, the degree of difficulty may be determined to be approximately equal to the pre-determined threshold when the degree of difficulty is within a rate of error of the pre-determined threshold. For example, if the pre-determined threshold is a number (such as 7.5), the degree of difficulty may be approximately equal to 7.5 when it is within 1-2% of 7.5. In particular embodiments, the rate of error may include a rate of error for determining the degree of difficulty.

At step 540, an auto-suggestion for completing the character string is provided for display to the user. In particular embodiments, completing a character string may include any suitable manner of providing one or more characters to the character string in order to complete the character string. For example, completing a character string for the user may include correcting spelling in the character string (such as correcting the spelling of "helo" to "hello"), correcting grammar in the character string, (such as changing "I lie the pencil on the table" to "I lay the pencil on the table"), correcting punctuation in the character string (such as adding a period to the end of a sentence), completing a word (such as completing the entry "colo" to be "color"), completing a phrase (such as completing the entry "as soon as p" to be "as soon as possible"), completing a sentence (such as completing the entry "The address of the White House is" to be "The address of the White House is 1600 Pennsylvania Avenue, NW Washington, D.C. 20500."), replacing a word (such as replacing the word "there" with the word "their"), replacing a number (such as replacing the number "53" with the number "35"), any other manner of completing the character string, or any combination of the preceding.

The auto-suggestion (to be provided for display to the user) may be determined by personal computing device 400 in any suitable manner. As a first example, the auto-suggestion may be determined based on a typeahead process. In such an example, a typeahead process may work (alone or in conjunction with one or more backend (server-side) typeahead processes executing at (or within) the social networking system 160) to interactively and virtually instantaneously (as appearing to the user) provide an auto-suggestion determined to be the most relevant or best match to the characters entered by the user as the user enters the characters. The typeahead processes may, for example, utilize social graph information in social networking system 160 (including information associated with nodes as well as edges), information about the user entering the text (including information entered in the user's profile page, information about the users friends, information about other nodes the user is connected with, etc.), and/or one or more matching algorithms to attempt to identify character strings to provide as an auto-suggestion. Further information regarding typeahead processes is included in U.S. patent application Ser. No. 13/631,489 filed on Sep. 28, 2012, and entitled "Enhanced Predictive Input Utilizing a Typeahead Process," which in incorporated herein by reference.

As a second example, the auto-suggestion may be determined based on a customized dictionary associated with the user. In particular embodiments, a customized dictionary may be a dictionary constructed for individual users or groups of users or for different communication channels. Words are collected from texts submitted by electronic-device users through various communication channels. The usage of these words are analyzed for different communication categories; and for each communication category, the words are sorted based on their respective usage frequencies in that communication category. Electronic dictionaries are constructed by blending some of the frequently used words in at least some of the communication categories. Different dictionaries may be constructed by blending the words differently. In some implementations, the customized dictionary may be selected based on factors such as, for example and without limitation, the type of electronic device used by the user to input the text, the recipients for receiving the inputted text, and the form of communication embodied by the inputted text. Further information regarding customized dictionaries is included in U.S. patent application Ser. No. 13/396,559 filed on Feb. 14, 2012, and entitled "User Experience with Customized User Dictionary," which in incorporated herein by reference.

As a third example, the auto-suggestion may be determined based on a social context of a communication session in which the user is involved. In particular embodiments, a communications session may include any communications session. For example, a communications session may include an e-mail sent from the user, a Short Message Service (SMS) message sent from the user, an Instant Messaging (IM) session involving the user, a post by the user to a profile page of another user (such as the user posting to the profile page of one of the user's friends), a comment by the user on content associated with another user (such as a comment by the user about a picture uploaded by one of the user's friends), any other type of communication by the user, or any combination of the preceding. In particular embodiments, the communication session may be between the user and one or more additional users. For example, the communication session may be between the user and one or more of the user's friends. In particular embodiments, social context of the communication session may include information about one or more circumstances of the communication session. For example, the social context may include a previous communication between the user and other users (such as a previous communication between the user and a user's friend), a relationship of the user to other users (such as whether the user is related to the other user), computing devices being used by the user or other users (such as the identity or type of computing devices being used), software applications being used by the user or the other users (such as if the user and the user's friend are communicating while playing a particular game, such as chess), subject matter of the communication session (such as if the user is communicating using acronyms), any other social context, or any combination of the preceding.

Once an auto-suggestion for completing the character string is provided for display to the user, the method moves to step 550. At step 550, the method ends.

While the method of FIG. 5 illustrates the method ending if it is determined that the degree of difficulty does not exceed the pre-determined threshold (or is not approximately equal to the pre-determined threshold), in particular embodiments, the method may (instead) move back to step 510, where one or more characters of the character string are received. In such embodiments, if the characters input by the user are initially determined to have a degree of difficulty that does not exceed the pre-determined threshold (or is not approximately equal to the pre-determined threshold), the method may allow the user to keep entering characters. Therefore, if the entry is later determined to have a degree of difficulty that exceeds the pre-determined threshold (or is approximately equal to the pre-determined threshold), personal computing device 400 may then provide an auto-suggestion for completing the character string. As an example, when the user has only entered the characters "co", personal computing device 400 may determine that the degree of difficulty of such an entry may not exceed the pre-determined threshold (or may not be approximately equal to the pre-determined threshold). However, when the user has entered "collocui", personal computing device 400 may determine that the degree of difficulty now exceeds the pre-determined threshold (or is approximately equal to the pre-determined threshold) and may auto-suggest the word "colloquium" and/or "colloquialism".

Additionally, while the method of FIG. 5 illustrates that the degree of difficulty for the user entering the character string is determined based (at least in part) on what has already been input by the user (such as how many characters have already been entered by the user, how many times the user has switched between various keyboards while entering the character string, etc.), in particular embodiments, the degree of difficulty may also be determined based on the completed character string. For example, while the user is inputting data, personal computing device 400 may already be determining the auto-suggestions for completing the character string (even though these auto-suggestions may not be provided for display to the user). In such an example, personal computing device 400 may further determine whether the degree of difficulty of completing the character string would exceed the pre-determined threshold (or be approximately equal to the pre-determined threshold). If it would, personal computing device 400 may provide the auto-suggestions for display to the user (even if the degree of difficulty of what has already been input by the user is not yet approximately equal to the pre-determined threshold or does not yet exceed the pre-determined threshold).

Furthermore, while the method of FIG. 5 is illustrated as providing an auto-suggestion for completing the character string when it is determined that the degree of difficulty exceeds the pre-determined threshold (or is approximately equal to the pre-determined threshold), in a particular embodiments, personal computing device 400 may further add the character string to the user's custom dictionary when a degree of difficulty exceeds the pre-determined threshold (or is approximately equal to the pre-determined threshold). For example, if a user's inputs "I love the movie 'Singing In'", personal computing device 400 may determine that the degree of difficulty of such an input exceeds the pre-determined threshold, and therefore, may auto-suggest the sentence "I love the movie "Singing In The Rain."" Furthermore, based on the determination that the degree of difficulty exceeds the pre-determined threshold, personal computing device 400 may also add this character string (or a portion of this character string, such as just "Singing In The Rain") to the user's custom dictionary.

Figure 6:
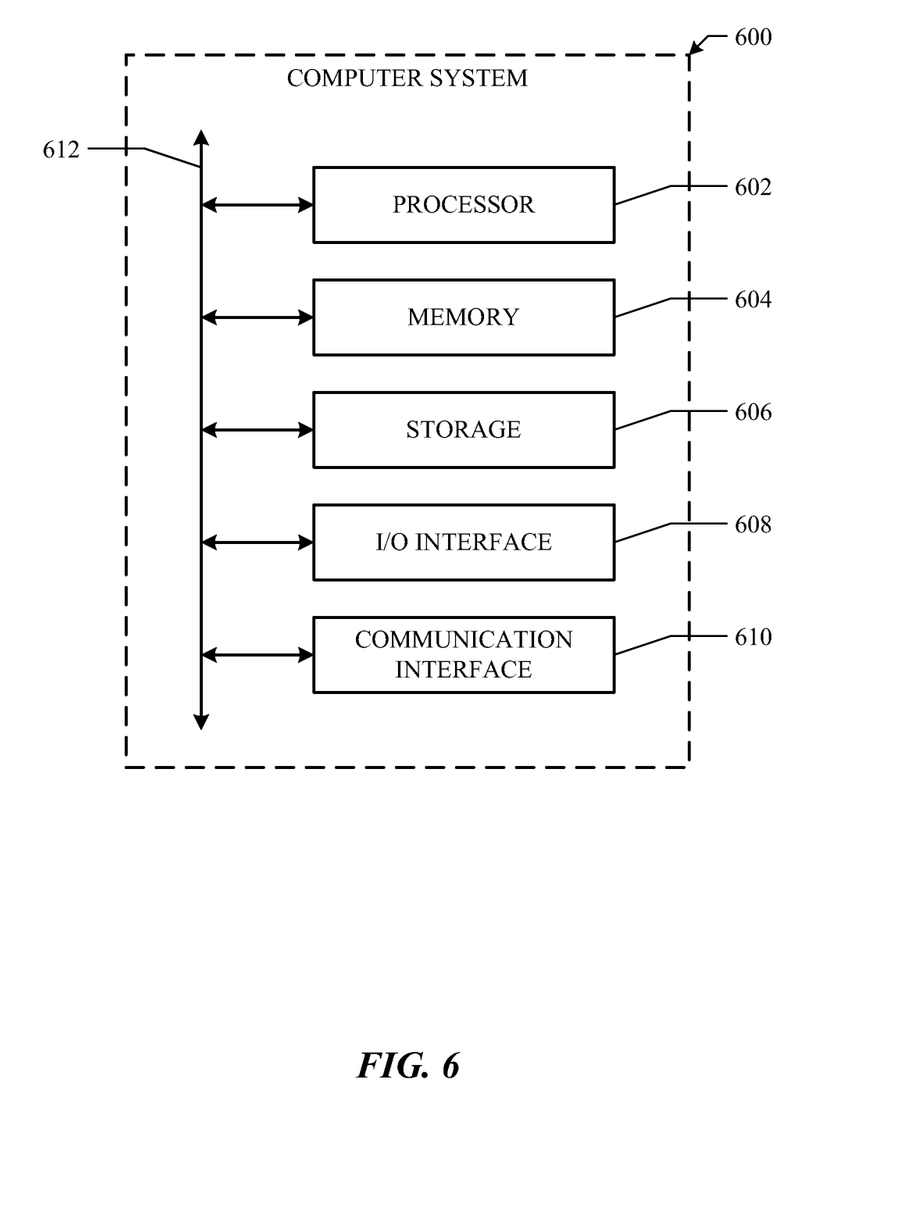
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, receiving one or more characters of a character string as a user enters the character string into a graphical user interface (GUI) of the computing device;
by the computing device, determining a degree of difficulty of the user entering the character string into the GUI of the computing device; and
by the computing device, if the degree of difficulty is at least approximately equal to or exceeds a pre-determined threshold, providing for display to the user an auto-suggestion for completing the character string for the user.

2. The method of claim 1, wherein the degree of difficulty is based at least in part on:
a length of the character string;
a number of keyboard shifts associated with entering the character string;
a number of special characters in the character string;
a number of capitalizations in the character string; or
an amount of time associated with entering the character string.

3. The method of claim 1, wherein the character string is a word.

4. The method of claim 1, wherein the character string is a phrase.

5. The method of claim 1, wherein the pre-determined threshold is based at least in part on one or more previous inputs by the user over a period of time.

6. The method of claim 1, wherein completing the character string comprises:
correcting spelling in the character string;
correcting grammar in the character string;
correcting punctuation in the character string;
completing a word;
completing a phrase;
completing a sentence;
replacing a word; or
replacing a number.

7. The method of claim 1, wherein the auto-suggestion for completing the character string for the user is based at least in part on a customized dictionary associated with the user.

8. The method of claim 1, wherein the auto-suggestion for completing the character string for the user is based at least in part on a social context of a communication session associated with entering the character string.

9. The method of claim 8, wherein the social context of the communication session comprises:
a previous communication between the user and one or more of the second users;
a relationship of the user to each of one or more of the second users;
computing devices being used by the user and one or more of the second users in the communication session;
software applications being used by the user and one or more of the second users in the communication session; or
subject matter of the communication session.

10. The method of claim 1, wherein the computing device is a mobile computing device of the user.

11. One or more computer-readable non-transitory storage media embodying software that is operable when executed to:
receive one or more characters of a character string as a user enters the character string into a graphical user interface (GUI) of a computing device;
determine a degree of difficulty of the user entering the character string into the GUI of the computing device; and
if the degree of difficulty is at least approximately equal to or exceeds a pre-determined threshold, providing for display to the user an auto-suggestion for completing the character string for the user.

12. The media of claim 11, wherein the degree of difficulty is based at least in part on:
a length of the character string;
a number of keyboard shifts associated with entering the character string;
a number of special characters in the character string;
a number of capitalizations in the character string; or
an amount of time associated with entering the character string.

13. The media of claim 11, wherein completing the character string comprises:

correcting spelling in the character string;
correcting grammar in the character string;
correcting punctuation in the character string;
completing a word;
completing a phrase;
completing a sentence;
replacing a word; or
replacing a number.

14. The media of claim 11, wherein the auto-suggestion for completing the character string for the user is based at least in part on a social context of a communication session associated with entering the character string.

15. The media of claim 14, wherein the social context of the communication session comprises:
   a previous communication between the user and one or more of the second users;
   a relationship of the user to each of one or more of the second users;
   computing devices being used by the user and one or more of the second users in the communication session;
   software applications being used by the user and one or more of the second users in the communication session; or
   subject matter of the communication session.

16. A system comprising:
   one or more processors; and
   a memory coupled to the processors comprising instructions executable by the processors, the processors operable when executing the instructions to:
      receive one or more characters of a character string as a user enters the character string into a graphical user interface (GUI) of a computing device;
      determine a degree of difficulty of the user entering the character string into the GUI of the computing device; and
      if the degree of difficulty is at least approximately equal to or exceeds a pre-determined threshold, providing for display to the user an auto-suggestion for completing the character string for the user.

17. The system of claim 16, wherein the degree of difficulty is based at least in part on:
   a length of the character string;
   a number of keyboard shifts associated with entering the character string;
   a number of special characters in the character string;
   a number of capitalizations in the character string; or
   an amount of time associated with entering the character string.

18. The system of claim 16, wherein completing the character string comprises:
   correcting spelling in the character string;
   correcting grammar in the character string;
   correcting punctuation in the character string;
   completing a word;
   completing a phrase;
   completing a sentence;
   replacing a word; or
   replacing a number.

19. The system of claim 16, wherein the auto-suggestion for completing the character string for the user is based at least in part on a social context of a communication session associated with entering the character string.

20. The system of claim 19, wherein the social context of the communication session comprises:
   a previous communication between the user and one or more of the second users;
   a relationship of the user to each of one or more of the second users;
   computing devices being used by the user and one or more of the second users in the communication session;
   software applications being used by the user and one or more of the second users in the communication session; or
   subject matter of the communication session.

* * * * *